United States Patent
Delatorre

(10) Patent No.: US 9,021,855 B2
(45) Date of Patent: May 5, 2015

(54) TORSIONAL FLOW SENSOR

(71) Applicant: Leroy C. Delatorre, Sugar Land, TX (US)

(72) Inventor: Leroy C. Delatorre, Sugar Land, TX (US)

(*) Notice: Subject to any disclaimer, the term of this patent is extended or adjusted under 35 U.S.C. 154(b) by 392 days.

(21) Appl. No.: 13/694,268

(22) Filed: Nov. 14, 2012

(65) Prior Publication Data

US 2013/0145817 A1    Jun. 13, 2013

Related U.S. Application Data

(60) Provisional application No. 61/629,119, filed on Nov. 14, 2011.

(51) Int. Cl.
- *G01F 1/28* (2006.01)
- *G01F 25/00* (2006.01)
- *G01F 1/82* (2006.01)
- *G01F 1/20* (2006.01)

(52) U.S. Cl.
CPC ............. *G01F 1/28* (2013.01); *G01F 25/0007* (2013.01); *G01F 1/82* (2013.01); *G01F 1/206* (2013.01)

(58) Field of Classification Search
CPC ............... G01F 1/28; G01F 1/80; G01F 1/82; G01F 1/90; G01F 25/0007
USPC .............................. 73/152.54, 861.71, 861.74
See application file for complete search history.

(56) References Cited

U.S. PATENT DOCUMENTS

| | | | |
|---|---|---|---|
| 2,706,406 A | 4/1955 | Vincent et al. | |
| 2,975,635 A | 3/1961 | Kindler et al. | |
| 3,241,367 A | 3/1966 | Moss et al. | |
| 5,463,903 A | 11/1995 | Delatorre | |
| 6,601,461 B2 | 8/2003 | Maxit et al. | |
| 8,181,537 B2 | 5/2012 | Delatorre | |
| 2011/0162446 A1* | 7/2011 | Delatorre | 73/152.34 |
| 2011/0314935 A1* | 12/2011 | Krippner et al. | 73/862.045 |
| 2012/0266694 A1* | 10/2012 | Szasz et al. | 73/862.044 |

* cited by examiner

*Primary Examiner* — Hezron E Williams
*Assistant Examiner* — David Z Huang
(74) *Attorney, Agent, or Firm* — W. Allen Marcontell

(57) ABSTRACT

A flow sensor with h no moving parts and which is suitable for miniaturization into a probe for fluid measurements in remote, hostile environments. It comprises an isolation torque tube to isolate a high pressure media from an instrument environment. and a highly sensitive disc torque sensor to measure the values of torque generated by flow across a static impeller. A proportionalized electric property signal is transmitted to a value reading station.

17 Claims, 4 Drawing Sheets

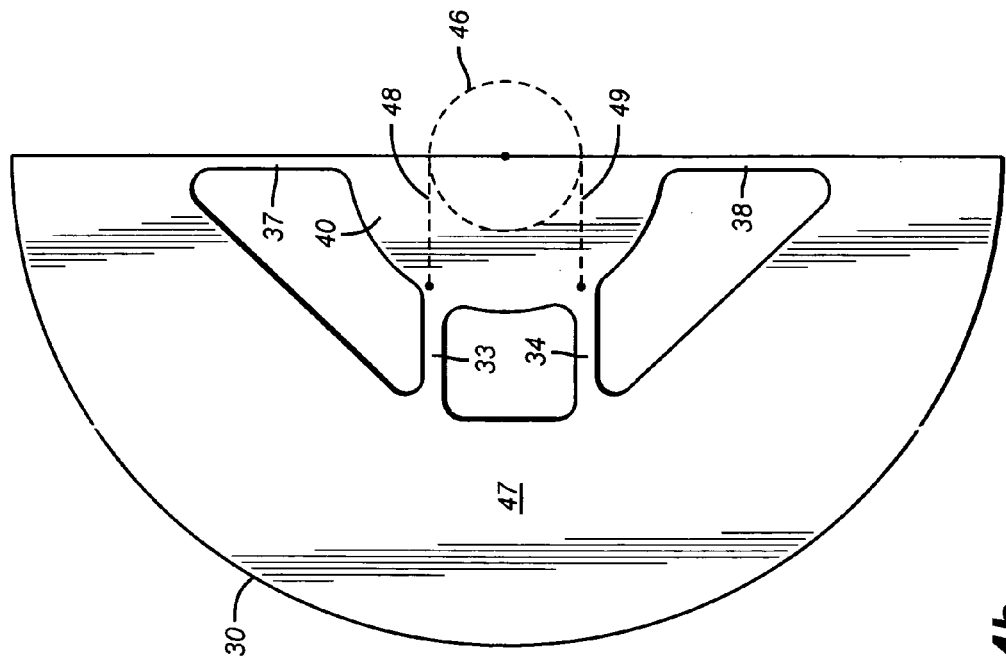
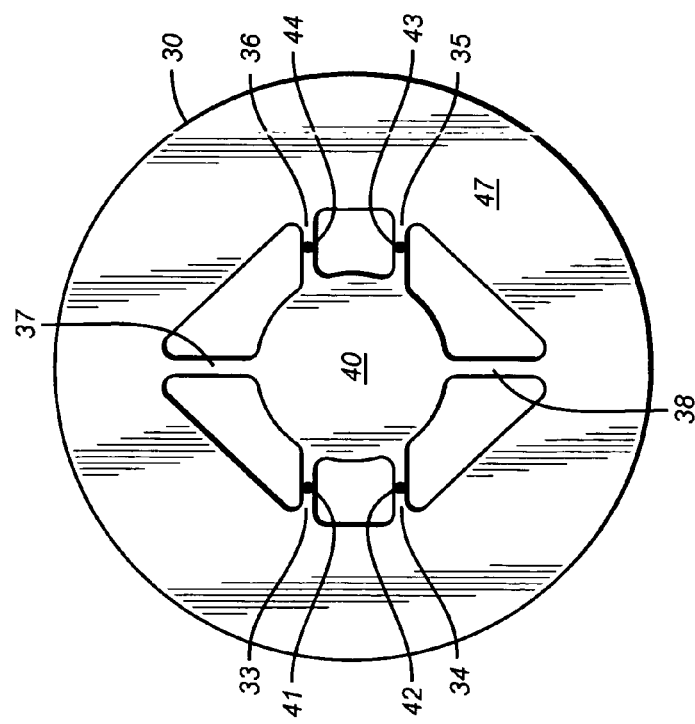
*FIG. 4b*
*FIG. 4a*

TORSIONAL FLOW SENSOR

CROSS-REFERENCE TO RELATED APPLICATION

The present invention claims the Nov. 14, 2011 Priority Date of U.S. Provisional Application No. 61/629,119.

BACKGROUND OF THE INVENTION

1. Field of the Invention

This invention relates to a flow sensor, suitable for use within an oil or gas well environment. Specifically, this environment will generally include exposure to high temperatures, high pressures, corrosive media, shock and vibration. Additional requirements are also a small diametrical size, low power consumption and the ability to make measurements while in motion.

2. Description of Related Art

Fluid flow, within an oil or gas well, has long been a very important parameter for well troubleshooting and evaluations. Recent developments have expanded this need to include flow measurements within horizontal sections of a well. This requirement introduces new complications for flow measurement because gas-oil-water flow mixtures will naturally separate within a horizontal pipe. This occurs as the lighter fluid (or gas) rises to the highest elevation while the densest fluid falls to the lowest level. These fluids will also tend to flow at different velocities so that flow measurement at any single point will not give very useful information. Flow measurement, under these conditions then, would be best performed by a multiplicity of small probes to allow profiling of the distribution of the phases.

The most suitable instrument for downhole fluid flow measurement has traditionally been based on a turbine type flow meter. The physical sizes of standard downhole turbine flow meters, however, are not suitable to be utilized for a multi-probe instrument. Small diameter turbine flow meter probes have been designed to profile phase distribution but these are often unreliable because it takes very little to obstruct their freedom to spin.

This is one of two significant limitations for the application of turbine flow meters, in a downhole environment, and both are a consequence of flow measurement based on moving parts. The turbine must spin freely to give an accurate measurement and this can be hampered by many factors such as bearing friction or contaminated fluid media. Bearing friction is generally the primary limiting factor for low flow measurements and bearing wear or fluid contamination generally cause the failure to spin altogether. All of these factors are greatly aggravated by the reduction in diameter which is necessary for multi-probe application within a relatively small diameter pipe. This is unavoidable because the available torque to spin the impeller becomes reduced by both, the moment arm radius of the impeller and its effective area.

It is an object of this invention, then, to provide a fluid flow sensor suitable for making accurate fluid flow measurements within a downhole media and which can also be miniaturized for application in a multi-probe design for phase flow profiling.

SUMMARY OF THE INVENTION

This invention measures fluid flow by passing the fluid through an impeller and measuring the torque resulting from the flow. This torque measurand is passed from a high pressure well bore environment into an atmospheric pressure instrument environment by means of a torque isolation tube. The torque isolation tube allows the torque force to pass from a high pressure environment to an ambient pressure without any seals so that it accurately appears within the instrument housing for measurement by a highly sensitive torque sensor. Since the impeller is constrained from rotation, there are no moving parts to create the issues encountered with the turbine type flow meters. This invention provides a torque isolation tube and torque sensor combination which allows miniaturization to a small diameter while still maintaining resistance to vibration and shock.

BRIEF DESCRIPTION OF THE DRAWINGS

The advantages and further features of the invention will be readily appreciated by those of ordinary skill in the art as the same becomes better understood by reference to the following detailed description when considered in conjunction with the accompanying drawings in which like reference characters designate like or similar elements throughout.

FIG. 4a shows the torque sensing disc.

FIG. 4b is an illustration of the geometrical relationships.

DESCRIPTION OF THE PREFERRED EMBODIMENTS

Figure 1A:
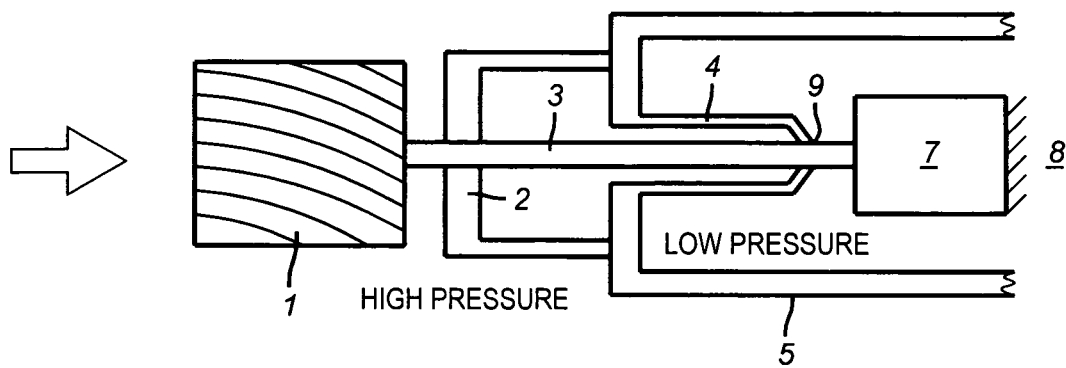
FIG. 1a is an illustration of an internally pressured torque tube type flow sensor.

FIG. 1a illustrates an internally pressured torque tube 4 used to isolate a high pressure media from a low pressure instrument environment. In this figure the high pressure also surrounds a pressure housing 5 which will ultimately enclose the torsion measurement device. As shown, a static impeller 1 is exposed to flow to create an input torque on shaft 3. The input torque is passed by means of shaft3 to appear as an output torque inside the pressure housing 5 and this is detected by torque sensor 7 which is anchored at 8. the shaft 3 also passes through a frictionless bearing 2 which provides a second support for the shaft. The first support is provided at 9 by the torque tube 4 so another shaft support is needed to allow it to support impeller 1. A frictionless bearing is generally constructed of radial beams which bend to allow twisting of a shaft over a small angle but are rigid for radial loads.

Figure 1B:
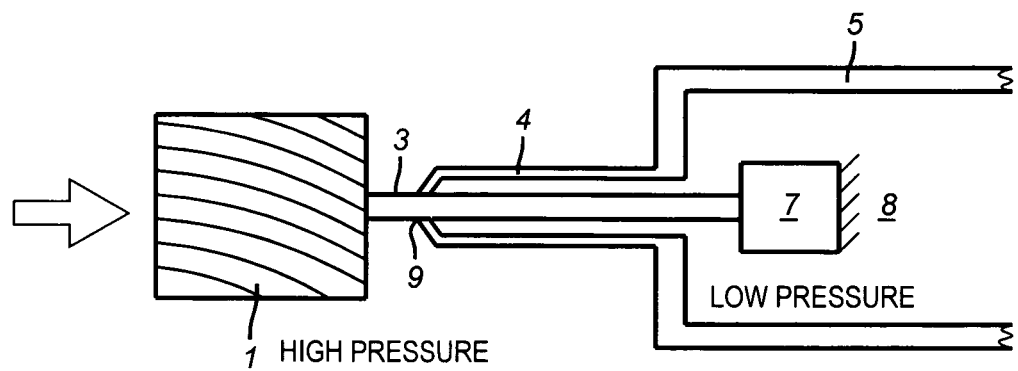
FIG. 1b is an illustration of an externally pressured torque tube type flow sensor.

FIG. 1b shows an externally pressured torque tube 4 which serves the same purpose as the torque tube 4 of FIG. 1a. A frictionless bearing 2 of FIG. 1a, however, is not required in the arrangement of FIG. 1b because the torque sensor 7 provides one support point for the shaft 3 and the second support point is provided by the torque tube 4 at junction 9. The external pressure arrangement of FIG. 1b, then, offers an advantage of being easier to implement within a small diameter and avoiding the inaccuracies and torsion loss of a frictionless bearing.

Figure 2A:
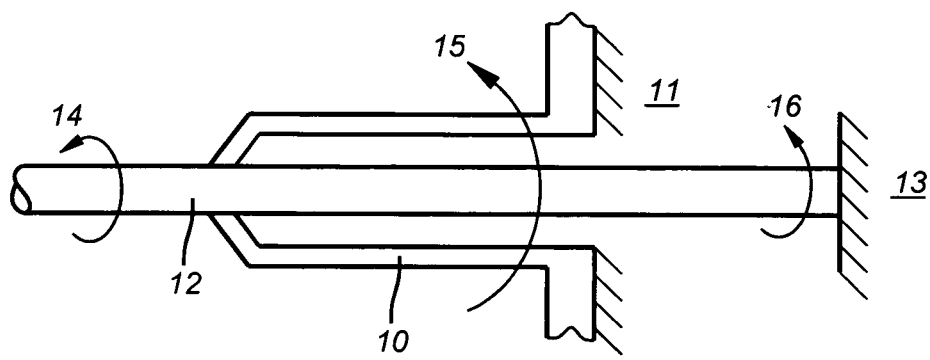
FIG. 2a illustrates the division of torque for an externally pressurized torque tube isolator.
Figure 2B:
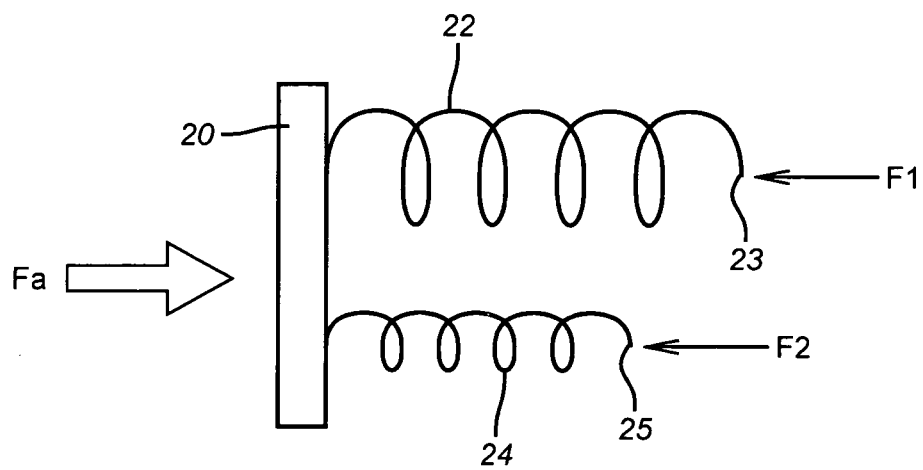
FIG. 2b is an illustration of a spring analogy for torque force division.

FIG. 2a illustrates a torque tube 10 anchored at its base 11 with a shaft 12 connected to its opposite end and also anchored at 13. An input torque 14 is transferred by shaft 12 to result in torque 15 at the base of the torque tube 11 and also torque 16 at the anchored end of the shaft 12. FIG. 2b is shown to illustrate how the applied torque 14 divides into torque 16 and torque 15. In FIG. 2b, the torque force of FIG. 2a has been replaced by an applied force Fa on plate 3. Plate 3 is only allowed to move in a direction parallel to Fa so it will displace springs 22 and 24 equally. The springs do not have to be the same length so spring 22 is shown to be longer than spring 24. Reaction forces F1 and F2 are shown and these are the forces necessary to keep the spring ends 23 and 25 from moving. These reaction forces would be equivalent to the base torques 15 and 16 of FIG. 2a.

In FIG. 2b, the spring force constants are not equal, just as the torsional rigidities of the torque tube and shaft of FIG. 2a and not. K1 and K2 are the force constants for the springs of FIG. 2b, where F=K (spring displacement), then F1=K2/K1+K2)* Fa and F2+K1/(K1+K2). By analogy, the same holds true for the splitting of applied torque 14 in FIG. 2a.

In FIG. 2a, the torsional rigidity of the shaft is inversely proportional to its length but proportional to the fourth power of its radius. Similarly, the torsional rigidity of the torque tube is inversely proportional to its length and proportional to the fourth power of its outer radius less the fourth power of its inner radius. It is a requirement, however, that the shaft will always fit inside the torque tube so the torsional rigidity of the shaft will always be less than that of the torque tube. This will result in a maximum transfer of about 30 percent of applied torque 14 to the shaft base torque 16 for a torque tube sized for high pressure applications if two conditions are met. These conditions are that the shaft outside diameter is made very close to the inner diameter of the torque tube and that the length of the shaft, within the torque tube is not significantly longer than the active length of the torque tube. This transfer torque relationship, of course, will directly affect the sensitivity seen by the torque sensor 7 of FIG. 1b and is very important for a small diameter impeller which automatically has a low torque response to flow.

Figure 3:
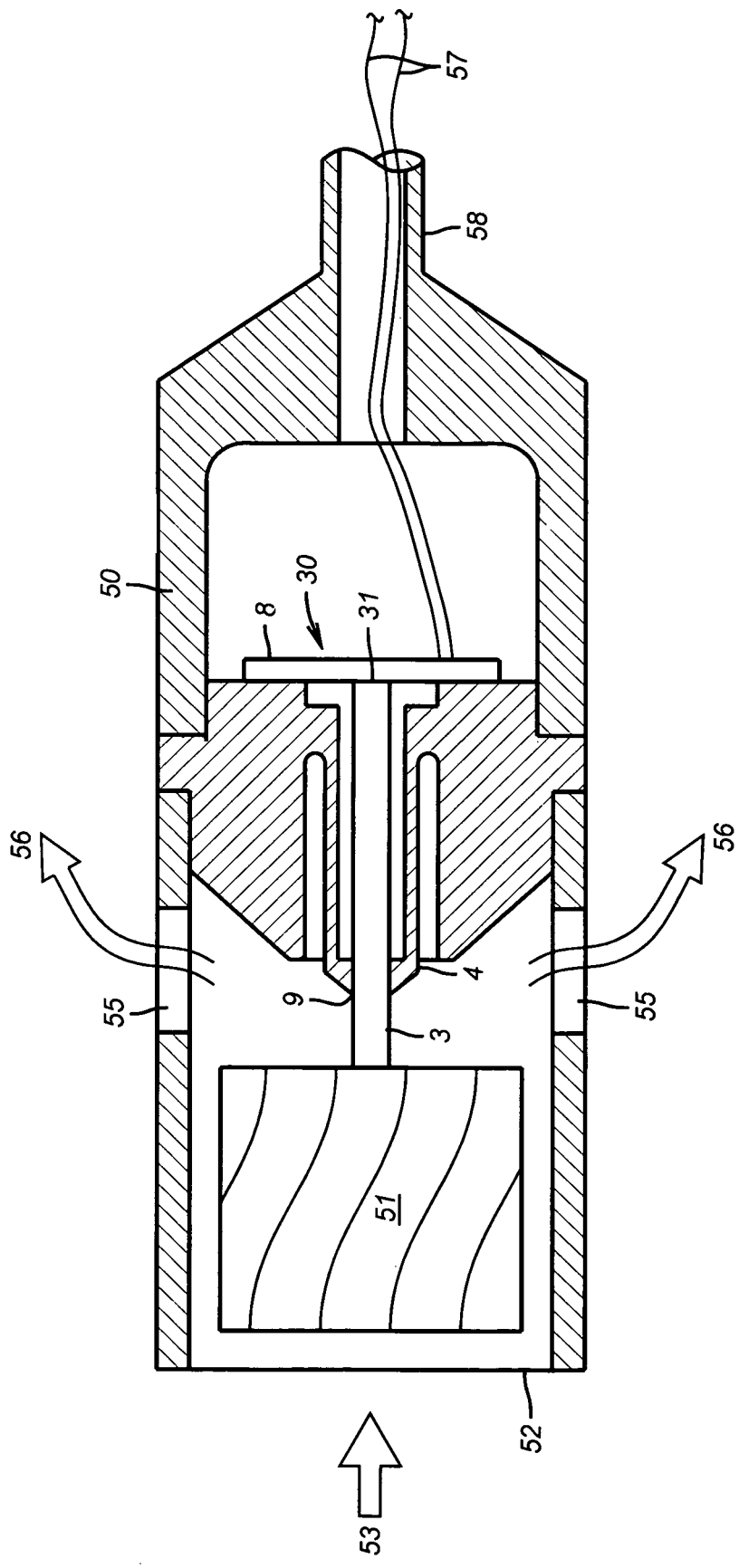
FIG. 3 is a section view of the externally pressurized torque tube isolator.

FIG. 3 is a view of the external pressured isolation torque tube flow sensor utilized for this invention. It consists of a torsion shaft 3 which is attached to and passes through isolation torque tube 4 and is terminated into torque sensor 30 at its base 31. Torque sensor 30 comprises a thin metallic disc with a pattern etched into it as shown in FIG. 4a. This disc not only provides a means for sensing the torque present at the base of shaft 3 but also provides a very accurate position support for the base of shaft 3 by virtue of its attachment to the shaft base at 31 and to the housing anchor at 8.

As per the previous discussion, the length of the torsion shaft 3 between its attachment 9 to the torque tube 4 and torque sensor 30 should not significantly exceed the internal active length of the torque tube 4. The use of a thin disc torque sensor 30 at the base of the torque tube and as a torque sensor allows this requirement to be met. Additionally, the capability of the disc to accurately center the torsion shaft within the isolation torque tube allows the outside diameter of the torsion shaft to be sized very close to the inside diameter of the torque tube without concern for contact between them. This meets the second criteria previously outlined.

It should be apparent that, in addition to the expected twisting of the torsion shaft, because of its rigidity ratio to that of the torque tube, the input torque must also provide any additional twisting displacement necessary to drive the torque sensor 30. This additional torsional displacement will represent an additional require torque and it is equal to the required torsional displacement of the torque sensor times the torsional rigidity of the torque tube. It is absolutely essential, then, that the torque sensor should require very small torsional displacements to generate its readings. This is also achieved by the disc torque sensor 30 as will be further described. Additionally, the design of the thin disc torque sensor 30 allows the torque loss of the torque tube isolator to be compensated for by several options for increasing its sensitivity.

FIGS. 4a and 4b show the configuration used to achieve these objectives. FIG. 4a shows a top view of the disc torque sensor 30 of FIG. 3 and the pattern etched into it. This pattern comprises six beams, 33 through 38 formed as spokes bridging a separation space between a concentrically smaller inner circle 40 and a larger outer circle 47. The outer circle 47 is secured about the circle perimeter to the housing 50 and forms the anchor 8 of FIG. 3. Strain gages 41 through 44 are attached to the tops of beams 33 through 36. Although these strain gages 41 through 44 are depicted as circular dots they are, in reality, rectangular micro-gages which are mounted to measure the strain along the length of each beam. Beams 37 and 38 are provided to restrict any shaft movement perpendicular to the direction of measurement beams 33 through 36 so that the shaft 3 is rigidly supported in all directions. As previously described, the end of shaft 3 of FIG. 3 is attached to the center circle segment 40 of FIGS. 4a and 4b. Beams 37 and 38 do not serve to make any measurements but are made longer than beams 33 to 36 to allow flexibility for very small rotations of the center circle segment 40.

FIG. 4b is an expanded view of the left half of the disc 30 of FIG. 4a. Parallel beams 33 and 34 are shown, by dotted line extensions 48 and 49 drawn to an imaginary interface circle segment 46, to be in projected tangential alignment with the interface circle segment 46. It is to be understood that parallel beams 33 and 34 are mirrored by parallel beams 35 and 36 on the diametrically opposite side of the interface circle 46. Although not a rigorous analysis, the purpose of the interface circle 46 is to show that for micro displacements the beams 33 and 34, can be interpreted as exxentially responding to the tangent forces of this smaller diameter circle 46, as opposed to the actual diameter of the larger circle segment 40. Since torque force acting on a circular object is the product of a tangent force times its radius, then a measurement responding to the smaller diameter 46 will be subjected to a greater force than if it were responding to the tangent force of the larger circle segment 40. Placement of beams 33 and 34 in alignment with projected tangents of the interface circle 46 and with respect to the center axis, then, will allow the flexibility of being able to choose a scale factor for the torque force applied to the sensing beams 33 through 36.

The ability to scale the disc sensor response to torque is further extended by the choice of the sensing beam dimensions including the thickness of the disc itself. Hence, the torsional force acting on each beam divided by its cross sectional area will define the stress within the beam and, therefore, the strain occurring with it. This strain, then, is the quantity being measured by the strain gauges. Once these parameters are selected then the length of the beams will determine how much displacement is experienced by the input torsion.

As an example, if the disc 30 is 0.003 inches thick and each beam, 33 through 36 is 0.01 inches wide then its cross sectional area is 3e-5 square inches. Also, if a force of 1 lb. is applied along each beam axis, then a stress of 33,000 psi will be generated within it. If the beam material is a stainless steel then this stress will result in a length change of 0.0011 inches per inch of length. Now, if the effective length of the beam is 0.04 inches, then the displacement at the end of each beam will be 0.04×0.0011=44 micro-inches. This displacement would be produced by an input torque of 4×0.075/2=0.15 inch-lbs (1 lb. for each beam), if the diameter of the inner circle 9 is 0.075 inches. The beam displacement will also result in a shaft rotation of 44/0.075=0.000587 radians. All of these dimensions are practical for this device.

Referring back to FIG. 3, the pressure housing 50 has its entrance end 52 open to incoming flow 53. This flow moves past the impeller 51 and then out through slots 55 provided at the base of the impeller around the circumference of the pressure housing. This flow past the impeller generates a proportional torque in torsion shaft 3 which is passed from the high pressure environment of the impeller to the instrument environment by isolation tube 4. Isolation tube 4 can twist with the applied torque and this is passed by torsion shaft 3 to torque sensor disc 30 by means of its attachment 31. The isolation tube 4 is welded to the torsion shaft 3 at point 9. The effects of the high pressure on the isolation tube 4 are to slightly alter its linear dimension but this does not generate a torque on the torsion shaft 3. The disc torque sensor 30 is also attached to the pressure housing at its periphery 8 and this serves to center the shaft, 3, and also anchor its base at 31. Out put signal leads 57 from the strain gages on the disc exit through a conduit port 58 which also serves as a mounting column for the sensor. The leads 57 connect the strain gages 41 through 44 to instrumentation that is calibrated to correlate the measured strain to a property of fluid flow over the static impeller 51.

Although the invention disclosed herein has been described in terms of specified and presently preferred embodiments which are set forth in detail, it should be understood that this is by illustration only and that the invention is not necessarily limited thereto. Alternative embodiments and operating techniques will become apparent to those of ordinary skill in the art in view of the present disclosure. Accordingly, modifications of the invention are contemplated which may be made without departing from the spirit of the claimed invention.

The invention claimed is:

1. A fluid parameter measuring device comprising:
   first and second coaxial torque transfer elements, each having first and second ends, said first end of said first element secured to sensor means, said second end of said first element secured to torque generation means responsive to fluid flow, said first end of said second element secured to housing means, said second end of said second element secured to said first element between said first and second ends;
   said sensor means comprising first and second concentric discs separated predominately by space, said first disc having a smaller outside diameter than said second disc, said first element first end secured coaxially to said first disc at a circular interface having a diameter less than said first disc, said second disc secured about the perimeter thereof to said housing, said first and second discs linked by a pair of parallel spokes bridging said space tangentially from said interface circle perimeter on diametrically opposite sides of said interface circle;
   strain gage means secured to said spokes for detecting strain on said spokes induced by fluid flow over said torque generation means; and,
   instrument means for correlating said detected strain to a property of fluid flow over said torque generation means.

2. A fluid parameter measuring device as described by claim 1 wherein said housing means encloses said sensor means.

3. A fluid parameter measuring device as described by claim 1 wherein said housing means environmentally isolates said sensor means from said torque generation means.

4. A fluid parameter measuring device as described by claim 1 having a pair of centering spokes linking said first and second discs in a disposition substantially normal to said pairs of parallel spokes.

5. A fluid parameter measuring device as described by claim 4 wherein said pair of centering spokes are longer than said parallel spokes.

6. A fluid parameter measuring device as described by claim 1 wherein said torque generation means is a static impeller.

7. A method of measuring a fluid parameter comprising the steps of:
   providing first and second concentric torque transfer elements;
   securing a first end of said first torque element to a housing;
   securing a second end of said first torque element to said second element between first and second ends of said second torque element;
   securing said first end of said second torque element to a torque generation element responsive to fluid flow across said torque generation element;
   securing said second end of said second torque element to a disc torque sensor means;
   connecting said disc torque sensor means to instrumentation; and
   calibrating said instrumentation to a property of fluid flow over said torque generation element.

8. A method of measuring a fluid parameter as described by claim 7 wherein a static impeller is provided for said torque generation element.

9. A method of measuring a fluid parameter as described by claim 7 wherein said instrumentation is calibrated for fluid flow over a static impeller.

10. A method of measuring a fluid parameter as described by claim 7 wherein an environment surrounding said sensor is isolated from the environment surrounding said torque generation element.

11. A method of measuring a fluid parameter as described by claim 7 wherein said disc torque sensor is provided with a pair of thin, concentric discs, a first of said discs being provided with an outer diameter greater than an outer diameter of a second of said discs.

12. A method of measuring a fluid parameter as described by claim 11 wherein said second end of said second torque element is secured to said second disc within an interface circle have a diameter less than said second disc.

13. A method of measuring a fluid parameter as described by claim 12 wherein said second disc is linked to said first disc by a pair of parallel spokes positioned on diametrically opposite sides of said second disc.

14. A method of measuring a fluid parameter as described by claim 13 wherein said pairs of parallel spokes are aligned with tangential extensions from said interface circle.

15. A method of measuring a fluid parameter as described by claim 14 wherein said second disc is linked to said first disc by centering spokes positioned on diametrically opposite sides of said second disc and aligned substantially normal to said parallel pairs.

16. A method of measuring a fluid parameter as described by claim 13 wherein strain gages are provided on each of said parallel spokes to measure torque induced strain on said spokes.

17. A method of measuring a fluid parameter as described by claim 16 wherein fluid flow over a static impeller secured to a first end of said second torque element is a source of said strain on said spokes.

* * * * *